UNITED STATES PATENT OFFICE.

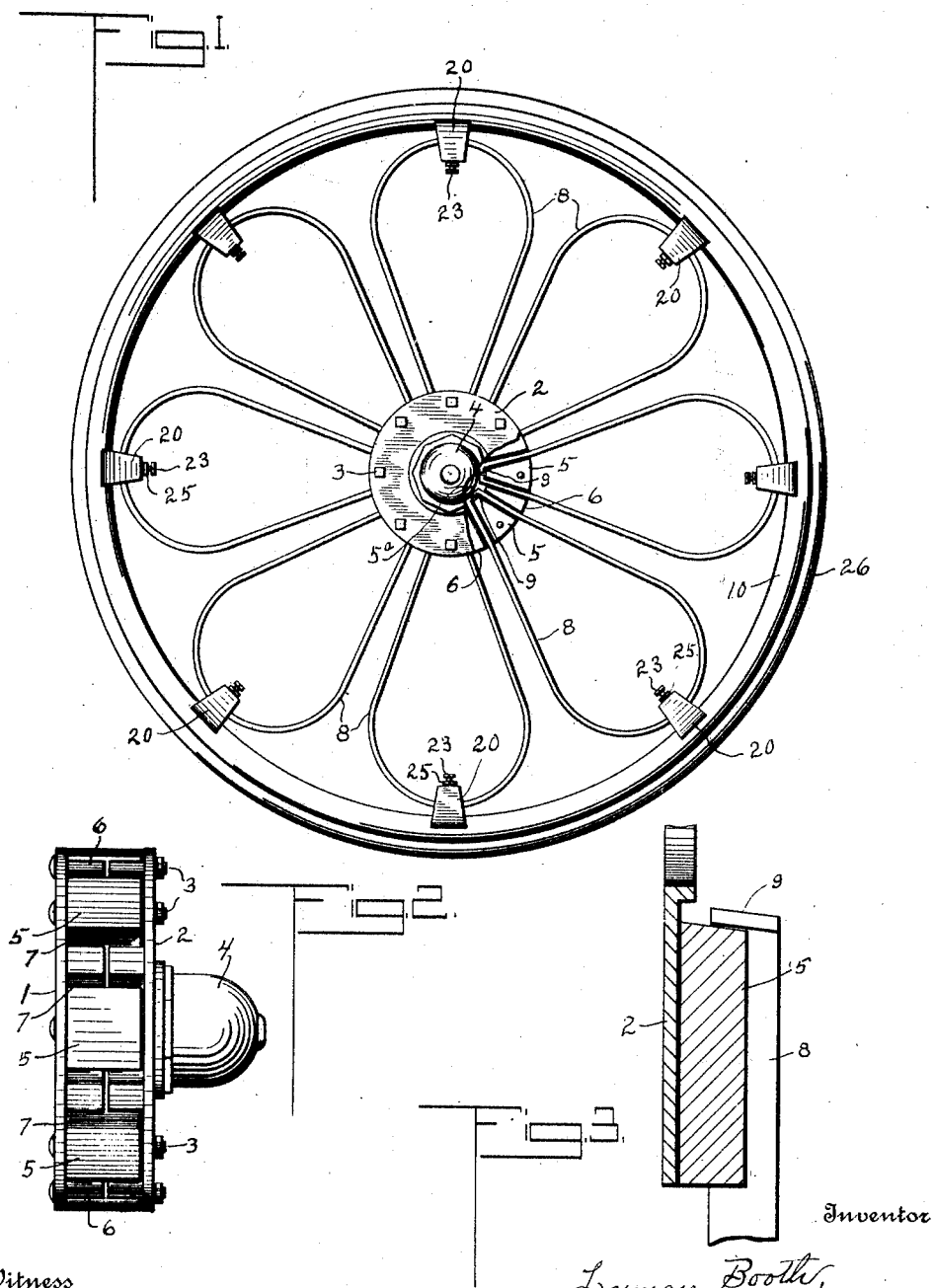

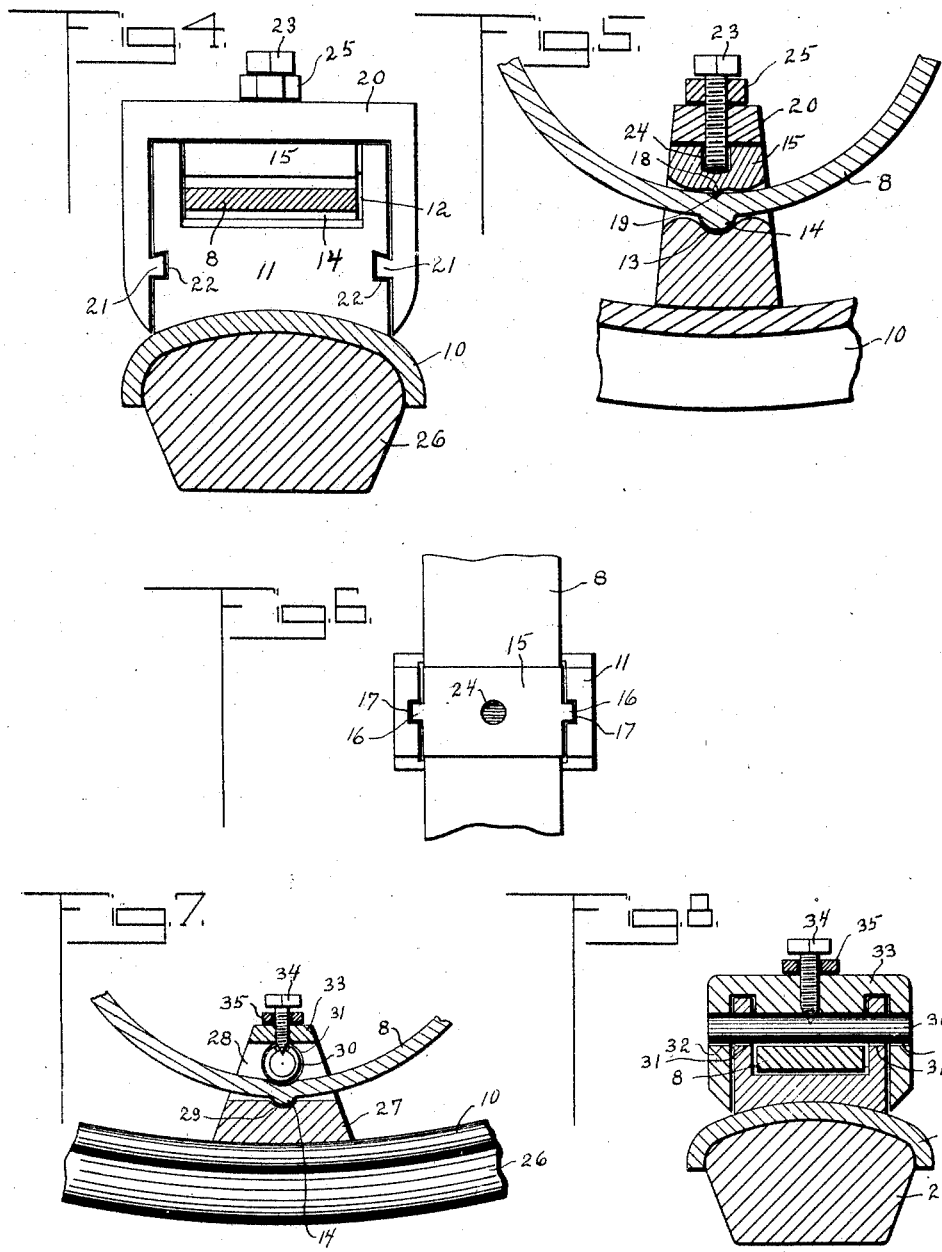

LYMAN BOOTH, OF DIXON, ILLINOIS.

RESILIENT WHEEL.

1,367,010.  Specification of Letters Patent.  Patented Feb. 1, 1921.

Application filed October 9, 1917. Serial No. 195,548.

*To all whom it may concern:*

Be it known that I, LYMAN BOOTH, a citizen of the United States, residing at Dixon, in the county of Lee and State of Illinois, have invented certain new and useful Improvements in Resilient Wheels, of which the following is a specification.

My invention has reference to resilient wheels, of that class in which a plurality of springs is interposed between the hub and rim of the wheel, to reduce, so far as possible, the jar and jolt caused by inequalities in the road, and do away with the necessity of using a pneumatic tire. The device is intended for use on automobiles, ambulances, and similar vehicles, is simple in form, and so constructed that any of the parts can be quickly removed and replaced. The novel features of my invention consist in the arrangement of the springs and the manner of securing them in place, so that one of the springs can be quickly and conveniently taken out of the wheel, in case it becomes impaired, and replaced with another one. The parts by which this is accomplished are few and simple, and when assembled hold the spring securely in position.

In the drawings:

Figure 1 is a side view of a wheel embodying my invention, with a portion of the hub thereof cut away. Fig. 2 is an edge view of the hub, detached. Fig. 3 is a detail, partly in section, showing the end of one of the springs 8 and accompanying block 5. Fig. 4 is a side view of one of the rim-connecting devices. Fig. 5 is a medial vertical section through one of said rim-connecting devices, when the same is in the position shown in Fig. 4. Fig. 6 is a plan view of the part 11, with the saddle 20 removed. Fig. 7 is a medial vertical section of a modified form of a rim-connecting clip, longitudinally of the rim. Fig. 8 is a transverse radial section thereof.

Similar parts are indicated by corresponding reference characters throughout the several figures.

The hub of the wheel is formed of an inner circular plate 1 and a similar outer plate 2, held together by means of bolts 3, the outer plate having removably attached thereto a cap 4. The plates 1 and 2 are held in a spaced-apart relation by means of wedge-shaped blocks 5 extending inwardly to a point near a central flange 5ª. Alternating with the blocks 5 are partitions 6, between which blocks and partitions are spaces 7, adapted to receive the arms of bowed springs 8, provided at their inner ends with lugs 9, engaging the inner ends of the blocks 5. The outer part of each spring is of semi-circular form, the arms extending therefrom toward the center and forming radial spokes, the spokes of adjacent springs being in parallel relation and spaced apart sufficiently so that they will not come in contact with each other when the springs are contracted.

For convenience of construction the blocks 5 and partitions 6 may be formed integrally with the plates 1 and 2, the parts 5 being connected with the plate 1, and the partitions being preferably formed in two parts, each attached to one of the plates, as shown in Fig. 2.

10 represents the rim of the wheel, to which each of the springs is connected by means of a clip 11, attached rigidly to the rim in any known manner, said clip being provided with a central opening 12 of sufficient width to receive one of the springs 8. The clip 11 is provided with a transverse depression 13 to receive a rib 14 on the spring 8, to prevent such spring from slipping in its seat.

Slidable in the inner part of the clip 11 is a plate 15, having lugs 16 (Fig. 6) movable in radial channels 17 in the end pieces of the clip, the outer face of said plate being provided with a ridge 18, positioned in a groove 19 in the inner face of the spring. The parts 11 and 15 are inclosed by a saddle 20, the end pieces of which are provided with ribs 21 slidable in channels 22 in the part 11. The cross-bar of the saddle 20 is provided with a screw-bolt 23, the outer end of which is rotatable in a recess 24 in the plate 15. By operation of said bolt the plate 15 is forced outwardly, clamping the spring 8 tightly between said plate and the clip 11. The outer face of the plate and inner face of the clip are curved outwardly away from the spring, to permit a free action of said spring in the contraction or expansion thereof. The screw-bolt 23 is provided with a set-nut 25, which is drawn tightly against the saddle 20 to prevent accidental release of the bolt.

To permit a removal of the bow part of the spring 8, the screw-bolt 23 is loosened and withdrawn until it clears the plate 15, whereupon the saddle 20 can be moved laterally of the clip 11, toward either side of the clip, until it is clear thereof. The plate 15 can then be removed, leaving the spring free to be removed from the clip. Before this is done, however, the plate 2 is released and removed, and the inner ends of the spring disconnected from the hub. In returning the spring to place, the outer part thereof is first connected with the rim, and then the inner ends of the arms thereof forced into place. In this operation the lugs 9 describe a modified arc of a circle, and the seating thereof is facilitated by forming such lugs at a slight incline with the arm, as shown in Fig. 3, and providing the inner end of the block 5 with a similar incline. The ends of the spring are thereby made practically self-seating.

When it is desired to again assemble the parts which hold the spring to the rim, such spring is first placed in position in the clip 11, next the plate 15 positioned above the spring, and the saddle 20 slipped back into position, and secured in place by the screw-bolt 23. Said screw-bolt has the two-fold function of causing the plate 15 to bear on the inner face of the spring and preventing the saddle 20 from lateral movement so as to become detached from the clip. As the plate 15 is forced outwardly there is a corresponding inward pressure on the saddle 20, and the ribs 21 and accompanying channels 22 are preferably given a dove-tail cut at their inner edges. By this means any inward movement of the saddle tends to draw the clip and saddle more tightly together, and prevent rattling of such parts.

By employing springs 8 of a suitable tension the usual pneumatic tires may be eliminated, and replaced by solid tires, of rubber or other similar material, as shown at 26.

In a wheel of the character herein shown and described, the weight of the vehicle is distributed to a large extent over all of the springs, those at the upper part of the wheel having a suspension effect, and contracting or expanding in a contrary manner to those in the lower part of the wheel opposed thereto. For this reason if one of the springs should be broken while the vehicle is in use, such breakage would not necessarily cause a stoppage of the vehicle, even if no extra springs were at hand.

It will be obvious that if it does become necessary to replace one of the springs, it can be readily accomplished by the use of a wrench, suitable to use on the fastening means for the plate 2 and the one screw-bolt in the rim fastening.

In Figs. 7 and 8 is illustrated a modified form of the rim fastening means for the spring, in which 27 is a clip secured to the rim 10, and having a central recess 28 to receive the bowed part of the spring 8, said clip being provided on its upper face with a depression 29 to receive the rib 14. A pin 30 passes through openings 31 in the ends of the clip 27 and similar openings 32 in the end-pieces of a saddle 33, by which means said saddle is rockingly connected with the clip. The saddle 33 is provided with a screw-bolt 34 the pointed end of which enters a perforation in the pin 30 and holds said pin from casual release. The screw-bolt 34 is also provided with a set-nut 35 for holding it securely in place. To remove the spring the screw-bolt 34 is released and turned until the pin 30 is free, whereupon it is forced from position, permitting the removal of the saddle and releasing the spring. To replace the parts the above operation is reversed.

What I claim as my invention and desire to secure by Letters Patent of the United States, is:

1. In a resilient wheel, the combination with the hub and rim thereof, of a plurality of bow-springs having arms removably connected with said hub; clips secured to said rim and adapted to receive said springs; clamp-plates slidable radially in said clips; saddles having a slidable relation with said clips, longitudinally of the rim; and means for actuating said clamp-plates and holding said saddles in an operative position.

2. In a device of the class described, a clip adapted for attachment to the rim of a wheel, having a spring-receiving recess, and provided on its outer faces with longitudinal channels, and on its inner faces with radial channels; a saddle provided with ribs for engagement with said first-named channels; a clamp-plate provided with ribs for engagement with said radial channels; and a screw-bolt operatively mounted in said saddle and having a clamping engagement with said plate.

In testimony whereof I affix my signature in the presence of two witnesses.

LYMAN BOOTH.

Witnesses:
W. N. HASKELL,
W. H. PERRY.